Patented Jan. 19, 1943

2,308,958

UNITED STATES PATENT OFFICE 2,308,958

METHOD OF DISPERSING RUBBER

Harry R. Williams, Akron, Ohio, assignor to The Firestone Tire & Rubber Company, Akron, Ohio, a corporation of Ohio No Drawing. Application June 26, 1940, Serial No. 342,537

5 Claims. (Cl. 260—740)

This invention relates to an improved method of dispersing rubber in an aqueous medium.

Heretofore, artificial rubber dispersions usually have been formed by milling rubber for about half an hour in order to break down the rubber after which a paste or gel of a colloid is slowly added to the rubber while it is being milled, this operation taking about an additional hour of milling. Next the rubber is removed from the mill and placed in an enclosed masticating device, such as a Day mixer, and water is slowly added to the compounded rubber as it is masticated. This water addition usually required 4 to 5 hours' mastication after which time a turnover point is reached at which the rubber changes from the continuous phase to the dispersed phase and the water becomes the continuous phase of the mixture which now is a liquid. These methods of forming rubber dispersions are expensive and the quality of the rubber obtained from the dispersed mixtures is rather low since the extensive mastication of the rubber greatly reduced the physical properties of the rubber obtained. Then too, the method of dispersing rubber is slow, requiring from 6 to 7 hours to obtain a satisfactory dispersion.

The general object of the present invention is to provide an improved method of dispersing rubber and to overcome the foregoing and other disadvantages of previous rubber dispersing methods.

A further object of the present invention is to provide a relatively rapid, inexpensive, easily practiced method of dispersing rubber with a minimum of mastication.

The foregoing and other objects will be apparent from the following specification:

The present invention, broadly speaking, comprises heating rubber in a steam chamber to impregnate the rubber with a volume of water which greatly aids the rubber in being dispersed, and then placing the rubber in an enclosed mixer and adding a colloid paste to the water impregnated rubber. Then the substances are mixed together and a smooth mixture is obtained after masticating for a few minutes, after which further water is slowly added to the mixture. Then, after an hour or two of mixing with continued water addition, a turnover from solid to liquid is made and the rubber goes into dispersion in the water which then becomes the continuous phase.

One specific example illustrating practice of the present invention is as follows:

3000 grams of rubber were heated for two hours in an autoclave to which steam at 290° F. was admitted. Then the rubber was removed from the autoclave and weighed and it was established that 570 grams of water had been forced into the rubber during the heating thereof. Preferably the rubber is broken into small particles or the surface of the rubber mass is cut so as to expose a maximum area to the steam. Then this water impregnated rubber was placed in a Day mixer and 600 grams of a stiff, casein paste were added thereto. This casein paste is composed of 50% casein, 32.5% water, 12.5% of ammonium hydroxide, and 5% of a preservative, that, in this case, was "Santobrite," which is a water soluble sodium salt of pentachlorphenol. Then after 16 minutes mastication in the mixer, a smooth homogeneous mixture was obtained which comprised a continuous phase of rubber in which the casein was dispersed. This smooth rubber mixture, which contains several percent of water, now is ready to receive more water. Hence, mastication is continued while water is slowly added to the mass. After 2800 grams of water were added to the mixture and the total mastication period was two hours and thirteen minutes, the solid mass, which had been absorbing the water up until that time, "turned over," or became a liquid with water being the continuous phase in which casein and rubber were dispersed. Then additional water is added to the dispersion and mixed with it to obtain the viscosity and solids content rubber dispersion desired.

In other procedures of the invention the temperature at which the rubber is exposed to steam may be varied, with the length of exposure to the steam being dependent upon the temperature. That is, the method of the invention has been satisfactorily practiced when rubber was exposed to steam at 300° F. for about one hour and also when exposed to steam at 240° F. for about three hours. In each case the water impregnated rubber, when mixed with a casein paste, smoothed out in about 15 minutes and then was formed into a rubber dispersion in water after about two hours of mastication in the Day mixer.

These times and pressures are not absolute limits of the invention as satisfactory water impregnation of the rubber can be obtained at temperatures and times above and below those given, the time of exposure being decreased as the temperature is increased. Other colloidal pastes may be used in place of the casein paste with soaps being especially adapted to be used in place of the casein, while salicyclic acid may be used as a preservative of the colloidal paste. Usually these colloidal pastes or gels should be kept in an enclosed container if they are not used immediately upon their preparation.

From the foregoing examples it will be apparent that the present invention provides a rapid, inexpensive, easily practiced method of dispersing rubber and that the objects of the invention are realized. A particular feature of the invention is the manner in which the first several percent of water is forced into the rubber and this permits the colloid paste to be added in about a quarter of the time previously required for such operation, while completely dispensing with the premastication of the rubber required in previous dispersing methods.

The present invention may be practiced by use of ordinary crude rubber while also being suitable for the dispersion of reclaimed rubber. In one instance, reclaimed rubber which had been heated about seven hours in steam at 375° F. in reclaiming same was dispersed by practice of the invention in less than half of the time required for the dispersion of ordinary crude or unvulcanized rubber, as pointed out hereinabove.

While one improvement of the invention has been completely described and illustrated here, it will be apparent that modifications hereof may be made without departing from the scope of the invention as defined in the appended claims.

What is claimed is:

1. That method of forming an aqueous dispersion of rubber comprising heating the rubber for about one hour with steam at about 300° F. which contacts the rubber and forces water into the rubber, mixing a casein paste with the water impregnated rubber until a substantially uniform mixture is obtained with rubber being the continuous phase, continuing the mastication of the uniform rubber-casein mixture, and slowly adding water to the rubber-casein mixture while masticating until the turnover point is reached and water is the continuous phase in which the casein and rubber are dispersed.

2. That method of forming an aqueous dispersion of rubber comprising heating the rubber for about two hours by steam at about 290° F. which contacts the rubber and forces water into the rubber, mixing a colloidal gel with the water impregnated rubber until a substantially uniform mixture is obtained, continuing the mastication of the uniform rubber-colloid mixture, and slowly adding water to the rubber-colloid mixture while masticating until the colloid and rubber are dispersed in the water added.

3. That method of forming an aqueous dispersion of rubber comprising heating the rubber with steam which contacts the rubber, mixing a colloidal paste with the water impregnated rubber until a substantially uniform mixture is obtained with rubber being the continuous phase, continuing the mastication of the uniform rubber-colloid mixture, and slowly adding water to the rubber-colloid mixture while masticating until the turnover point is reached and water is the continuous phase in which the colloid and rubber are dispersed.

4. That method of forming an aqueous dispersion of rubber comprising the steps of heating the rubber by steam directly contacting same, mixing a colloidal paste with the rubber to obtain a homogeneous mass in which the rubber is the continuous phase, and masticating the mass while slowly adding water thereto until the rubber is in the dispersed phase.

5. A method as in claim 4 wherein the colloid is in the form of an aqueous gel or paste having a water soluble sodium salt of pentachlorphenol therein.

HARRY R. WILLIAMS.